J. MOLD.
DRIVING PULLEY.
APPLICATION FILED JUNE 21, 1909.

948,516.

Patented Feb. 8, 1910.

Witnesses
C. E. Hunt
C. N. Greesbauer

Inventor
Julius Mold
by H. B. Willson & Co
Attorneys

UNITED STATES PATENT OFFICE.

JULIUS MOLD, OF SUNRISE, MINNESOTA.

DRIVING-PULLEY.

948,516. Specification of Letters Patent. Patented Feb. 8, 1910.

Application filed June 21, 1909. Serial No. 503,474.

*To all whom it may concern:*

Be it known that I, JULIUS MOLD, a citizen of the United States, residing at Sunrise, in the county of Chisago and State of Minnesota, have invented certain new and useful Improvements in Driving-Pulleys; and I do declare the following to be a full, clear, and exact description of the invention, such as will enable others skilled in the art to which it appertains to make and use the same.

This invention relates to an improved driving pulley or belt wheel which may be used with any kind of belt either square or round.

The object of the invention is to provide a driving pulley so constructed that slipping of the belt is rendered impossible and which has great capacity for transmitting power.

With this and other objects in view, the invention consists of certain novel features of construction, combination and arrangement of parts as will be more fully described and particularly pointed out in the appended claims.

Figure 1:
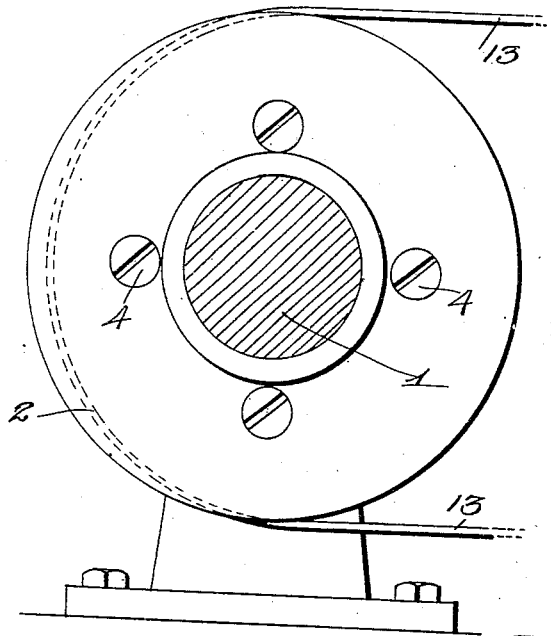
Figure 2:
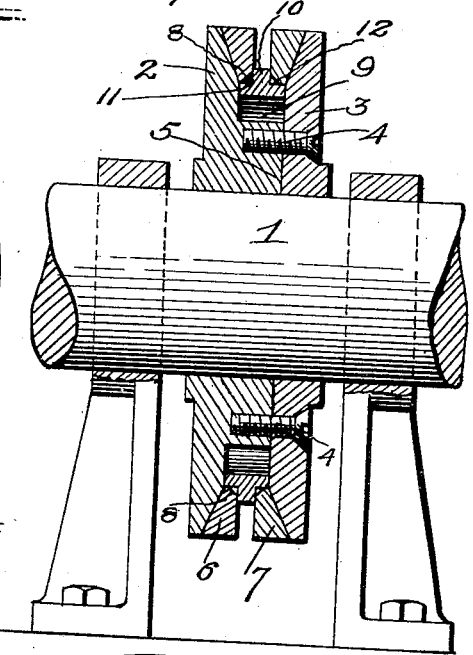
Figure 3:
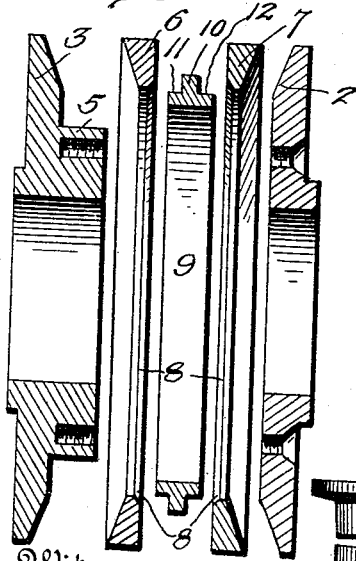
Figure 4:
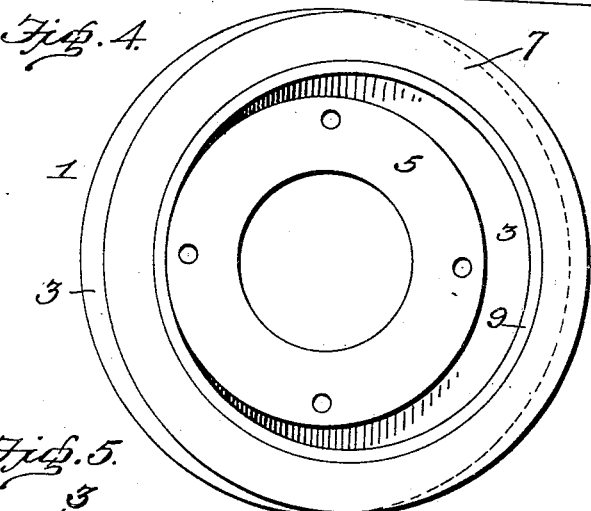
Figure 5:
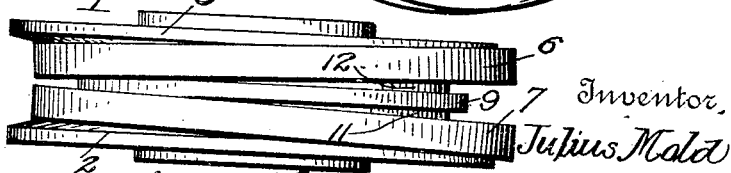

In the accompanying drawings; Figure 1 is a side elevation of one of these improved pulleys applied the shaft being shown in section. Fig. 2 is a vertical section thereof; Fig. 3 is a sectional view of the members comprising this pulley arranged in juxtaposition ready for assembling; and, Fig. 4 is a side elevation of this improved pulley with the flat outer disk removed and the gripping members shown in operative position. Fig. 5, is a top plan view of the pulley showing the rings in position to grip the belt.

In the embodiment illustrated a pulley is shown mounted on a driving shaft 1 supported in suitable bearings and comprising two laterally separable outer annular disk members 2 and 3 composed of any suitable material and preferably held connected in operative position by means of screws as 4 which pass through the flat disk member 2 and engage screw threaded sockets in the inner face of the hub 5 which projects from the inner face of the other member 3 a sufficient distance to provide a suitable space between the inner faces of the two outer disk members 2 and 3 to accommodate the parts hereinafter described. The inner faces of these members 2 and 3 are preferably flared outwardly toward their peripheries with which the gripping members hereinafter described are designed to engage. These belt gripping members comprise two similarly constructed rings 6 and 7 of the same diameter as the disks 2 and 3 having their outer faces curved transversely to form a concaved surface adapted to fit closely against the flared inner faces of the disks 2 and 3. The inner diameter of these rings 6 and 7 is considerably greater than that of the hub 5 to provide for the movement of the rings relatively to said hub for a purpose hereinafter described. The inner edges of the openings in these rings 6 and 7 are beveled as shown at 8 in Fig. 2 for engagement by a central member 9 now to be described. This central member 9 is constructed as shown in the form of a thin annulus having a centrally disposed rib 10 projecting from the periphery thereof forming seats 11 and 12 on opposite sides to receive the beveled edges of the rings 6 and 7 the periphery of said rings 6 and 7 extending beyond the periphery of the rib 10 a suitable distance to form a slot like opening between the members 6 and 7 to receive the belt 13. The draft of the belt pulls the rings 6 and 7 inward between the disks 2 and 3 thereby causing said rings to grip the belt on the front side and at the same time said rings open at the back or point diametrically opposite the point where they are forced inward by the belt whereby the belt freely enters and leaves the pulley and the greater the pull exerted on the belt the tighter the rings 6 and 7 will grip it. The hub 5 being of less diameter than the openings in the rings 6, 7 and 9 permits them to move under the belt draft and the thin central ring 9 serves to force the rings 6 and 7 back.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention.

1. A driving pulley comprising two laterally separable disk like outer members having a central shaft engaging aperture extending therethrough the inner face of one of said members being provided with a laterally extending hub, annular gripping members arranged between said disks and a thin ring arranged in the opening of said gripping members and having a centrally disposed annular rib on its outer face projecting between and separating said gripping members.

2. A driving pulley having a deep annular groove formed therein, annular gripping members arranged in said groove the diameters of the openings therein being greater than the diameter of the hub formed by the bottom of the groove, and an annular member arranged to engage the walls of the openings in said gripping members having a centrally disposed annular rib on the periphery thereof extending between said gripping members to form an annular belt receiving slot.

3. A driving pulley having a deep annular groove formed in the periphery thereof, laterally movable annular gripping members arranged in said groove the openings therein being of greater diameter than the bottom of the groove and means arranged between said gripping members to hold them normally spaced apart to form a belt receiving slot, said members being movable radially within said groove to tightly clamp the belt between them.

4. A driving pulley comprising two laterally separable annular disk like members one of said members having a laterally projecting hub on the inner face thereof, two annular gripping members the openings therein being of greater diameter than the diameter of the hub and the inner edges of said openings being beveled, and a thin ring arranged within said openings and having a centrally disposed annular rib formed on the periphery thereof and adapted to extend between said gripping members the beveled edges of which engage the opposite sides of said rib.

5. A driving pulley comprising two outer annular disk like members one of which is provided with a plurality of apertures extending transversely therethrough and the other with a hub projecting from the inner face thereof, said hub being provided with screw threaded sockets on its outer face adapted to register with the apertures in said flat disk, fastening screws adapted to extend through said apertures and engage said sockets for detachably connecting said outer disks, annular gripping members arranged between said disks, and means for normally holding said gripping members spaced apart to form a belt receiving slot, said members being radially movable on said hub to grip and release the belt.

6. A driving pulley comprising two laterally separable disk like outer members having registering shaft engaging centrally disposed apertures, the inner faces of said disks being flared outwardly toward their peripheries, one of said members having a hub extending inwardly therefrom, annular gripping members arranged between said disks the openings therein being of greater diameter than the hub and the outer sides of said members being concaved to fit the flared faces of the disks and the inner edges of the openings of said gripping members being beveled, and a thin ring arranged in the openings of said gripping members and having a centrally disposed annular rib formed on the periphery thereof and projecting between said gripping members to form a slot.

In testimony whereof I have hereunto set my hand in presence of two subscribing witnesses.

JULIUS MOLD.

Witnesses:
MARCUM LANTZ,
E. NORDGREN.